United States Patent [19]
Perlman et al.

[11] Patent Number: 5,742,820
[45] Date of Patent: Apr. 21, 1998

[54] MECHANISM FOR EFFICIENTLY SYNCHRONIZING INFORMATION OVER A NETWORK

[75] Inventors: Radia J. Perlman, Acton, Mass.; Neal D. Castagnoli, Morgan Hill, Calif.

[73] Assignee: Novell, Inc., Orem, Utah

[21] Appl. No.: 499,029

[22] Filed: Jul. 6, 1995

[51] Int. Cl.⁶ .................................................. G06F 17/30
[52] U.S. Cl. .................... 395/617; 395/610; 395/200.03; 395/200.09
[58] Field of Search .................. 395/610, 617, 395/200.03, 200.09

[56] References Cited

U.S. PATENT DOCUMENTS

| | | | |
|---|---|---|---|
| 5,129,082 | 7/1992 | Tirfling et al. | 395/600 |
| 5,249,268 | 9/1993 | Doucet | 395/200 |
| 5,265,092 | 11/1993 | Soloway et al. | 370/60 |
| 5,276,871 | 1/1994 | Howarth | 395/600 |
| 5,280,498 | 1/1994 | Tymes et al. | 375/1 |
| 5,479,654 | 12/1995 | Squibb | 395/617 |

FOREIGN PATENT DOCUMENTS

| | | |
|---|---|---|
| 0 348 331 | 12/1989 | European Pat. Off. . |
| 0 447 725 A2 | 9/1991 | European Pat. Off. . |

OTHER PUBLICATIONS

Ramabadran et al., "A Tutorial on CRC Computations", IEEE Micro, vol. 8, No. 4, Aug., 1988, pp. 62–75.

Radia Perlman, Interconnections Bridges and Routers, Addison–Wesley Professional Computing Series, Jul. 1992, pp. 242–245 and 272–275.

Computer Communications Review, 21 (1991) Jan., No. 1, New York, US, Inter Domain Policy Routing: Overview of Architecture and Protocols, Deborah Estin et al., pp. 71–79.

*Primary Examiner*—Paul R. Lintz
*Attorney, Agent, or Firm*—Cesari and McKenna

[57] ABSTRACT

A novel mechanism efficiently synchronizes the contents of databases stored on nodes of a computer network to-ensure that those contents are consistent. The mechanism comprises a database identifier generated by a node of the computer network and distributed to other receiving nodes coupled to the network. The database identifier is uniquely representative of the contents of the distributing node's database and the receiving nodes compare this unique identifier with their own generated database identifiers to determine if the identifiers, and thus their databases, are consistent and synchronized.

18 Claims, 6 Drawing Sheets

1

MECHANISM FOR EFFICIENTLY SYNCHRONIZING INFORMATION OVER A NETWORK

FIELD OF THE INVENTION

This invention relates generally to computer networks and, more particularly, to efficient synchronization of information across a computer network.

BACKGROUND OF THE INVENTION

A computer network is a geographically distributed collection of interconnected communication links for transporting data between nodes, such as computers. A plurality of computer networks may be further interconnected by intermediate nodes, or routers, to extend the effective "size" of the networks. Many types of computer networks are available, with the types ranging from local area networks (LANs) to wide area networks. A LAN, for example, is a limited area network that typically consists of a transmission medium, such as coaxial cable or twisted pair, for interconnecting nodes. These nodes typically communicate by exchanging discrete "packets" of data according to predefined protocols. In this context, a protocol consists of a set of rules defining how the nodes interact with each other.

In order to reduce design complexity, most networks are organized as a series of hardware and software levels or "layers" within each node. These layers interact to format data for transfer between, e.g., a source node and a destination node communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services.

In an attempt to standardize network architectures, i.e., the sets of layers d protocols used within a network, a generalized model has been proposed by the International Standards Organization (ISO). The model, called the Open Systems Interconnection (OSI) reference model, is directed to the interconnection of systems that are "open" for communication with other systems. The proposed OSI model has seven layers which are termed, in ascending interfacing order, the physical, data link, network, transport, session, presentation, and application layers. These layers are arranged to form a "protocol stack" in each node of the network.

FIG. 1 illustrates a schematic block diagram of prior art protocol stacks 125 and 175 used to transmit dam between a source node 110 and a destination node 150, respectively, of a computer network 100. Each protocol stack is structured according to the OSI seven-layer model; accordingly, each stack comprises a collection of protocols, one per layer. As can be seen, the protocol stacks 125 and 175 are physically connected through a communications channel 180 at the physical layers 124 and 164. For ease of description, the protocol stack 125 will be described.

Broadly stated, the physical layer 124 transmits a raw data bit stream over a communication channel 180, while the data link layer 122 manipulates the bit stream and transforms it into a datastream that appears free of transmission errors. This latter task is accomplished by dividing the transmitted data into frames and transmitting the frames sequentially, accompanied with error correcting mechanisms for detecting or correcting errors. The network layer 120 routes data packets from the source node to the destination node by selecting one of many alternative paths through the physical network. The transport layer 118 accepts the datastream from the session layer 116, apportions it into smaller units (if necessary), passes the smaller units to the network layer 120 and provides appropriate mechanisms to ensure that all the units arrive correctly at the destination.

The session layer 116 establishes data transfer "sessions" between software processes on the source and destination nodes, along with management of such sessions in an orderly fashion. That is, a session not only allows ordinary data transport between the nodes, but it also provides enhanced services in some applications. The presentation layer 114 performs frequently-requested functions relating to the presentation of transmitted data, including encoding of data into standard formats, while the application layer 112 contains a variety of protocols that are commonly needed by processes executing on the nodes.

Data transmission over the network 100 therefore consists of generating data in, e.g., a sending process 104 executing on the source node 110, passing that data to the application layer 112 and down through the layers of the protocol stack 125, where the data are sequentially formatted as a packet for delivery onto the channel 180 as bits. Those packet bits are then transmitted to the protocol stack 175 of the destination node 150, where they are passed up that stack to a receiving process 174. Data flow is schematically illustrated by solid arrows.

Although actual data transmission occurs vertically through the stacks, each layer is programmed as though such transmission were horizontal. That is, each layer in the source node 100 is programmed to transmit data to its corresponding layer in the destination node 150, as schematically shown by dotted arrows. To achieve this effect, each layer of the protocol stack 125 in the source node 110 typically adds information (in the form of a header field) to the data packet generated by the sending process as the packet descends the stack. At the destination node 150, the various headers are stripped off one-by-one as the packet propagates up the layers of stack 175 until it arrives at the receiving process.

As noted, a significant function of each layer in the OSI model is to provide services to the other layers. Two types of services offered by the layers are "connection-oriented" and "connectionless" network services. In a connection-oriented service, the source node establishes a connection with a destination node and, after sending a packet, terminates the connection. The overhead associated with establishing the connection may be unattractive for nodes requiring efficient communication performance. For this case, a fully connectionless service is desirable where each transmitted packet carries the full address of its destination though the network.

The connectionless network service is generally implemented by a network layer protocol, an aspect of which involves the routing of packets from the source node to the destination node. In particular, this aspect of the network layer concerns the algorithms and protocols used by routers when cooperating to calculate paths through a network topology. A routing algorithm is that portion of the network layer software responsible for determining an output communication link over which an incoming packet should be transmitted; a popular type of network layer routing protocol is a link state routing protocol.

According to this protocol, each router constructs a link state packet (LSP) comprising information, such as a list of "neighboring" nodes adjacent to the router, sufficient to generate a complete map of the topology of the network. The LSP is then forwarded to all other routers of the network, e.g., a plurality of interconnected LANs. Each of these Other routers stores only the most recently received LSP from the forwarding router in its LSP database. Armed with updated maps, these other routers may compute routes to destination nodes. An example of a distributed link state routing protocol is the intermediate system to intermediate system (IS-IS) protocol defined by ISO.

Since the computed routes are dependent upon the information stored in the LSP databases of the routers, it is essential that these databases are synchronized to ensure their contents are consistent and coherent. A known technique for closely synchronizing LSP databases is to have one node periodically summarize the state of its database. According to this technique, which is implemented by the IS—IS protocol, a single router on each LAN of the network is elected a designated router (DR) and the DR periodically transmits a complete sequence numbers packet (CSNP) to all other routers on the LAN. The CSNP consists of identifications of all LSP data items in the database, along with sequence numbers for these items. The routers that receive the CSNP compare it with the contents of their databases to determine whether their information is current.

For example, if the sequence number of an LSP listed in the CSNP is greater, i.e., more recent, than the sequence number for that LSP stored in the database of a receiving router, that router may request the more recent information pertaining to the LSP from the DR. On the other hand, if an LSP stored in the database of a receiving router has a sequence number that is greater than the sequence number for that LSP listed in the CSNP, the DR has transmitted "stale" information regarding that LSP. In response to this discovery, the receiving router transmits the more recent information associated with the LSP to the DR, which updates its database. Of course, if the contents of the CSNP are consistent with the contents of the receiving routers databases, no further action is required.

In order to characterize an entire LSP database, the CSNP may be very large, thereby requiring apportionment of the CSNP into smaller packet fragments for transmission over the LANs. Each packet fragment characterizes a contiguous portion of the database and each is processed independently by the receiving routers; this enables comparison of the CSNP items with each item of each router's LSP database. However, transmission of these additional smaller packets over the LANs consumes significant bandwidth, while processing oft he additional individual packets consumes substantial amounts of computational resources in the routers.

Therefore, it is among the objects of the present invention to reduce the bandwidth consumed by transmission of database summary information packets over a computer network.

Another object of the present invention is to minimize computational resources within routers needed to process received database summary information packets.

SUMMARY OF THE INVENTION

The invention comprises a mechanism for efficiently synchronizing the contents of databases stored on nodes of a computer network to ensure that those contents are consistent. Generally, the mechanism comprises a database identifier generated by a node of the computer network and distributed to other receiving nodes coupled to the network. The database identifier is uniquely representative of the contents of the distributing node's database and the receiving nodes compare this unique identifier with their own generated database identifiers to determine if the identifiers, and thus their databases, are consistent and synchronized.

In the illustrative embodiment described herein, the identifier is uniquely representative of a complete sequence numbers packet (CSNP) pertaining to the contents of a link state packet (LSP) database of the distributing node, e.g., a designated router. Specifically, the designated router generates the database identifier from the entire CSNP and periodically broadcasts that identifier, rather than the CSNP itself, to the receiving nodes, i.e., routers, on the network, such as a local area network (LAN). The database identifier is preferably generated from a cryptographic message digest algorithm configured to transform the contents of the CSNP into a unique, fixed-length digest "signature" whose contents are substantially less than those of the CSNP; accordingly, transmission of the database identifier in lieu of the CSNP optimizes both the use of computational resources within the receiving routers and bandwidth on the LAN.

Upon receiving the database identifer, the routers process that identifier to determine whether any discrepancies arise and if so, those routers may request copies of the entire CSNP. That is, each receiving router initially calculates an identifier based on the contents of its LSP database and then compares the calculated identifier with the database identifier received from the designated router. A receiving router whose calculated database identifier conforms to the received database identifier need only store that latter identifier of the CSNP. If the calculated identifier is different, the receiving router may request the CSNP to resolve any differences in its database. Significantly, the designated router transmits the actual CSNP only in response to a change in the database or a request from another router.

In the event a plurality of smaller packet fragments are needed for transmitting the CSNP over the LAN, the designated router preferably computes an identifier for each CSNP fragment. In an alternate embodiment of the invention, a hierarchical arrangement provides a single, high-level database identifier for the entire CSNP and a plurality of low-level database identifiers for these individual CSNP fragments. Here, the high-level identifier is periodically broadcast by the designated router and if a discrepancy is found at a particular router, that router may request a list of the low-level identifiers in order to isolate the discrepancy in the database.

In a related alternate embodiment, the hierarchical arrangement is modified to provide a two-stage operation arrangement at the receiving routers. Specifically, the high-level and low-level identifiers are bundled within a "hello" message that is periodically broadcast by the designated router to the receiving routers. According to the first operation stage, each receiving router calculates an identifier based on the entirety of its database, compares that identifier with the received high-level identifier and, if they match, ignores the remainder of the message. On the other hand, if the identifiers are dissimilar, the receiving router proceeds to the second stage, which specifies computing identifiers for particular fragments of the database. These latter identifiers are thereafter compared with the appropriate low-level identifiers to identify the inconsistent database fragments.

Advantageously, the inventive embodiments described above do not require extensive use of computational resources in the receiving routers unless there are inconsistencies in the databases. In other words, the invention conserves processing resources by potentially eliminating the need to labor through identifier calculations and comparisons for each database fragment. Moreover, these approaches are flexible in that the number of hierarchical layers, database fragments and low-level identifiers are selectable.

BRIEF DESCRIPTION OF THE DRAWINGS

The above and further advantages of the invention may be better understood by referring to the following description in conjunction with the accompanying drawings, in which like references indicate similar elements, and in which.

DETAILED DESCRIPTION OF ILLUSTRATIVE EMBODIMENT

Figure 1:
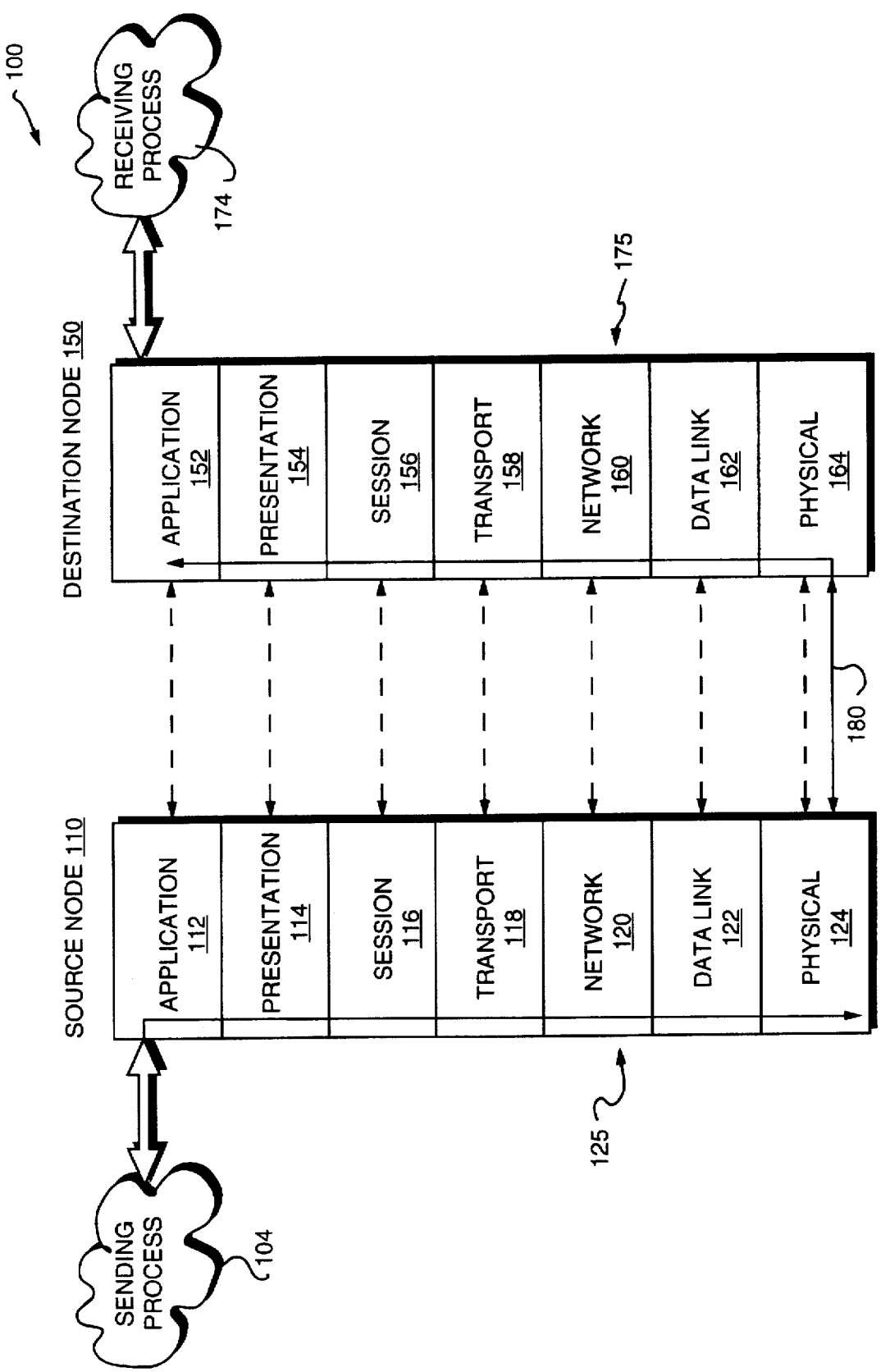
FIG. 1 is a schematic block diagram of prior art protocol stacks used to transmit data between nodes of a computer network.
Figure 2:
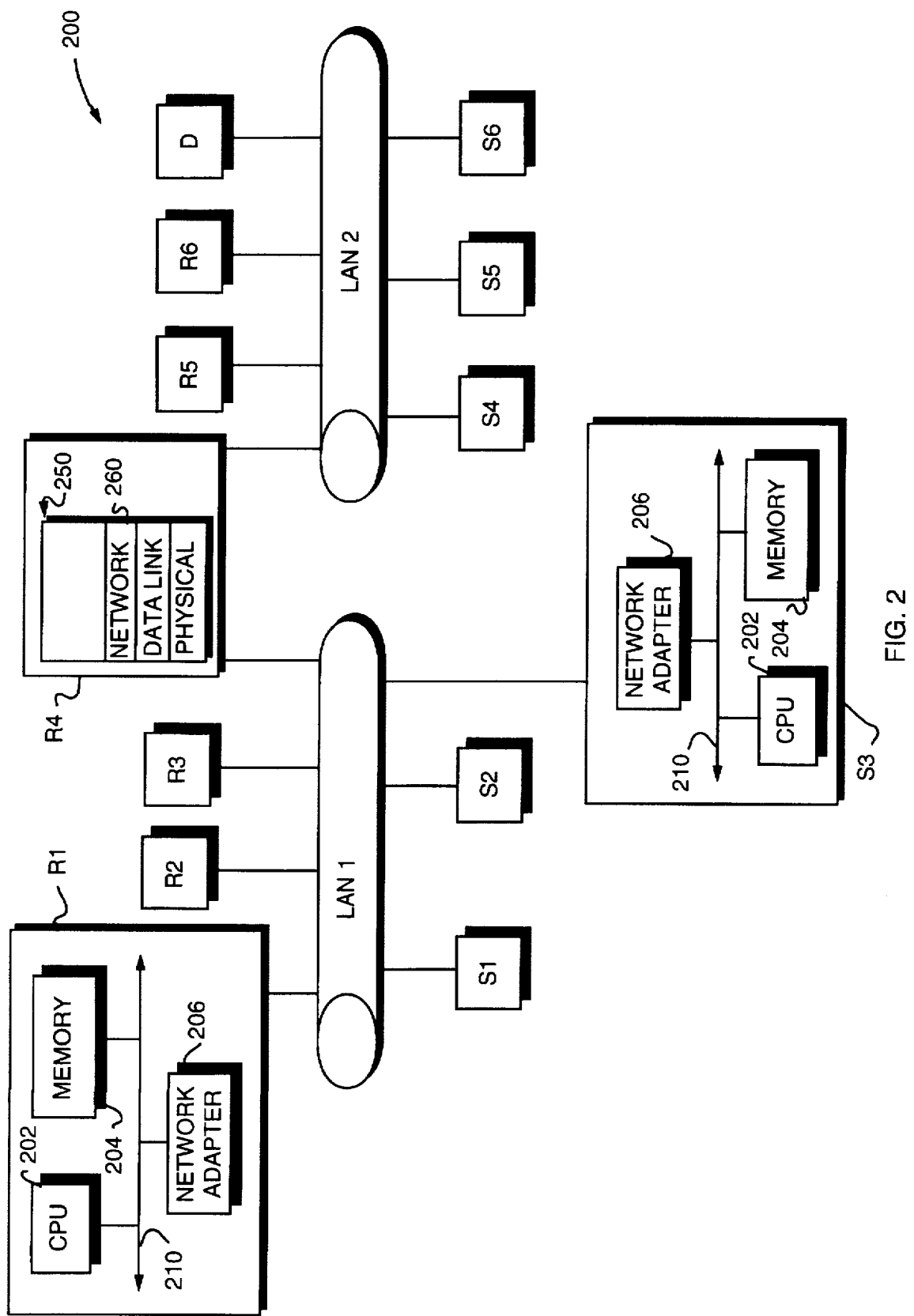
FIG. 2 is a block diagram of a network system including a collection of computer networks connected to a plurality of nodes.

FIG. 2 is a block diagram of a network system 200 comprising a collection of computer networks connected to a plurality of nodes. The nodes are typically general-purpose computers comprising source nodes S1–S6, destination node D and intermediate nodes R1–R6. Each node typically comprises a central processing unit (CPU) 202, a memory unit 204 and at least one network adapter 206 interconnected by a system bus 210. The memory unit 204 may comprise storage locations typically composed of random access memory (RAM) devices, which are addressable by the CPU 202 and network adapter 206. An operating system, portions of which are typically resident in memory and executed by CPU, functionally organizes the node by, inter alia, invoking network operations in support of processes executing in the CPU.

The computer networks included within System 200 are local area networks (LANs) 1–2 interconnected by intermediate node R4, which is preferably a router. Communication among the nodes coupled to the LANs is typically effected by exchanging discrete data "packets" among the nodes. Router R4 facilitates the flow of these data packets throughout the system by routing the packets to the proper receiving nodes.

In general, when a source node transmits a packet over LAN 1, the packet is sent to all nodes on that LAN. If the intended recipient of the packet is connected to LAN 2, the packet is routed through router R4 onto LAN 2. Typically, the packet contains two destination addresses: the address of the final destination node and the address of the next node along the route. The final destination address remains constant as the packet traverses the networks, while the next destination address changes as the packet moves from node to node along the route through the networks.

Specifically, when source node S1 sends a packet to destination node D, i.e., the final destination address, the packet is transmitted onto LAN 1 with a next destination address specifying the address of router R4. Address information embedded in the packet, which is processed by the higher-layer software of the protocol stack 250, identifies the final destination of the packet as node D. Based on this information, R4 determines that the next node is the final destination node D and transmits the packet over LAN 2 to node D.

A key function of a router is determining the next node to which the packet is sent; this routing function is preferably performed by network layer 260 of a protocol stack 250 within each node. This aspect of the network layer concerns the algorithms and protocols used by routers when cooperating to calculate paths through a network topology. The routers typically execute routing algorithms to decide over which communication links incoming packets should be transmitted; a type of network layer routing protocol commonly employed by routers is a link state routing protocol.

Figure 3:
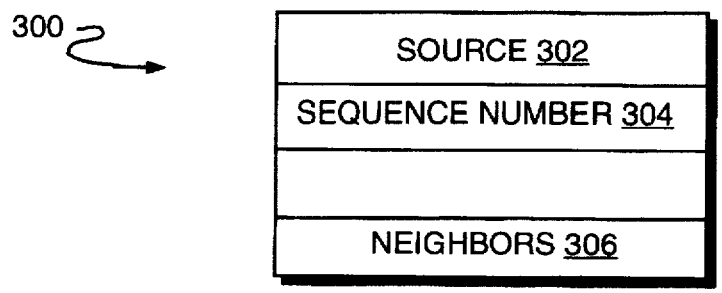
FIG. 3 is a schematic diagram of a conventional link state packet (LSP) used in accordance with a network layer routing protocol.

According to this protocol, each router constructs a link state packet (LSP) containing information needed to generate a complete map of the topology of the network. FIG. 3 depicts a schematic diagram of the LSP 300 comprising, inter alia, a source field 302 that indicates the particular source node generating the LSP, a sequence number field 304 for storing the sequence number of the LSP and a neighbors field 306 containing a list of "neighbors", i.e., nodes adjacent to the source node. The sequence number is preferably a monotonically increasing value that functions as a counter to uniquely identify the LSP.

Each router forwards its LSP 300 to all other routers coupled to the network and each of the other routers stores only the most recently received LSP in a LSP database organized in each of their memories 204 (FIG. 2). Armed with an updated set of LSPs, each router may execute predetermined algorithms to compute routes to destination nodes. An example of a distributed link state routing protocol is the intermediate system to intermediate system (IS—IS) protocol.

Figure 4A:
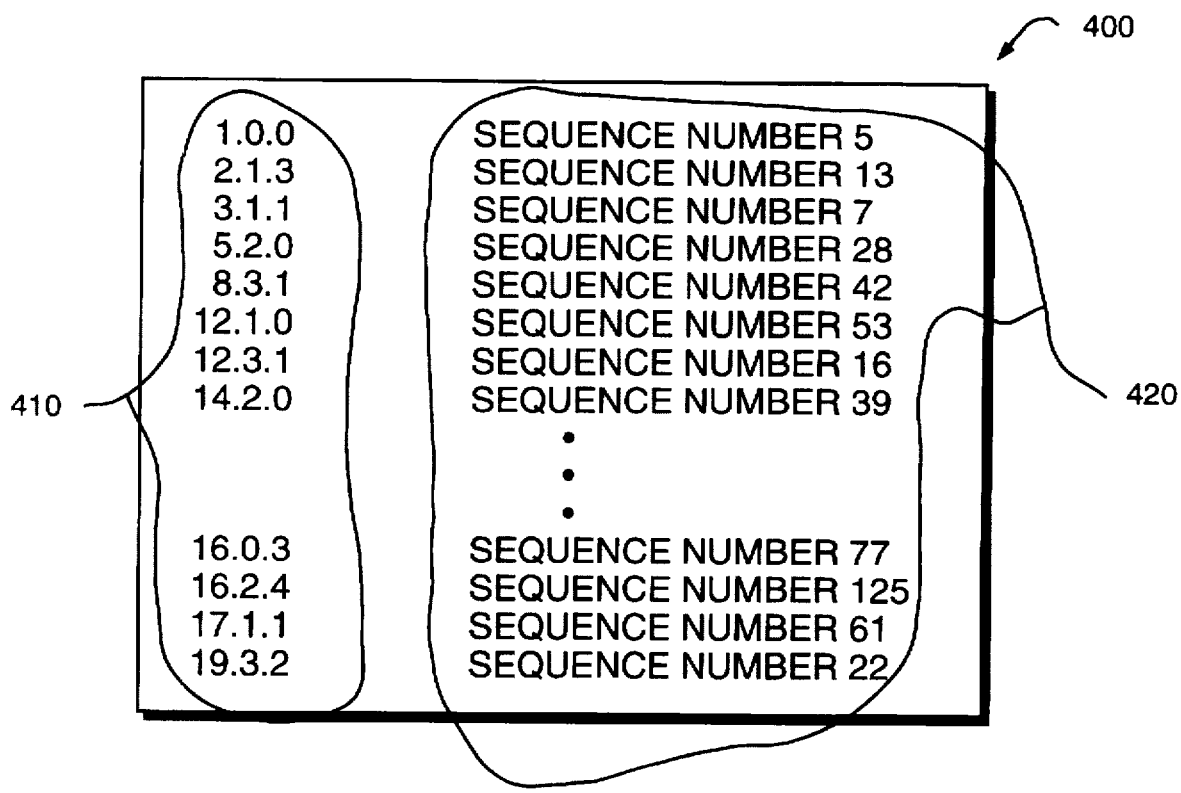
FIGS. 4A–4B are schematic diagrams of complete sequence numbers packets used in accordance with a network layer protocol.

Since the computed routes are dependent upon the information stored in the LSP databases of the routers, it is essential that these databases are synchronized to ensure their contents are consistent. A known technique for closely synchronizing LSP databases involves designating a single router on the network as a designated router that periodically transmits a complete sequence numbers packet (CSNP) to all other routers on the network. FIG. 4A is a schematic diagram of a CSNP 400 comprising a list of identifications of LSP data items 410 in the designated router's database, along with sequence numbers 420 for these items.

The routers that receive the CSNP 400 compare it with the contents of their databases to determine whether their information is current. That is, the routers compare each sequence number of the items listed in the CSNP with the sequence number of corresponding data items of their databases to determine if they are equal. If they are not, the greater, i.e., more recent, data item as indicated by the sequence number is provided to the router having the less recent item.

Figure 4B:
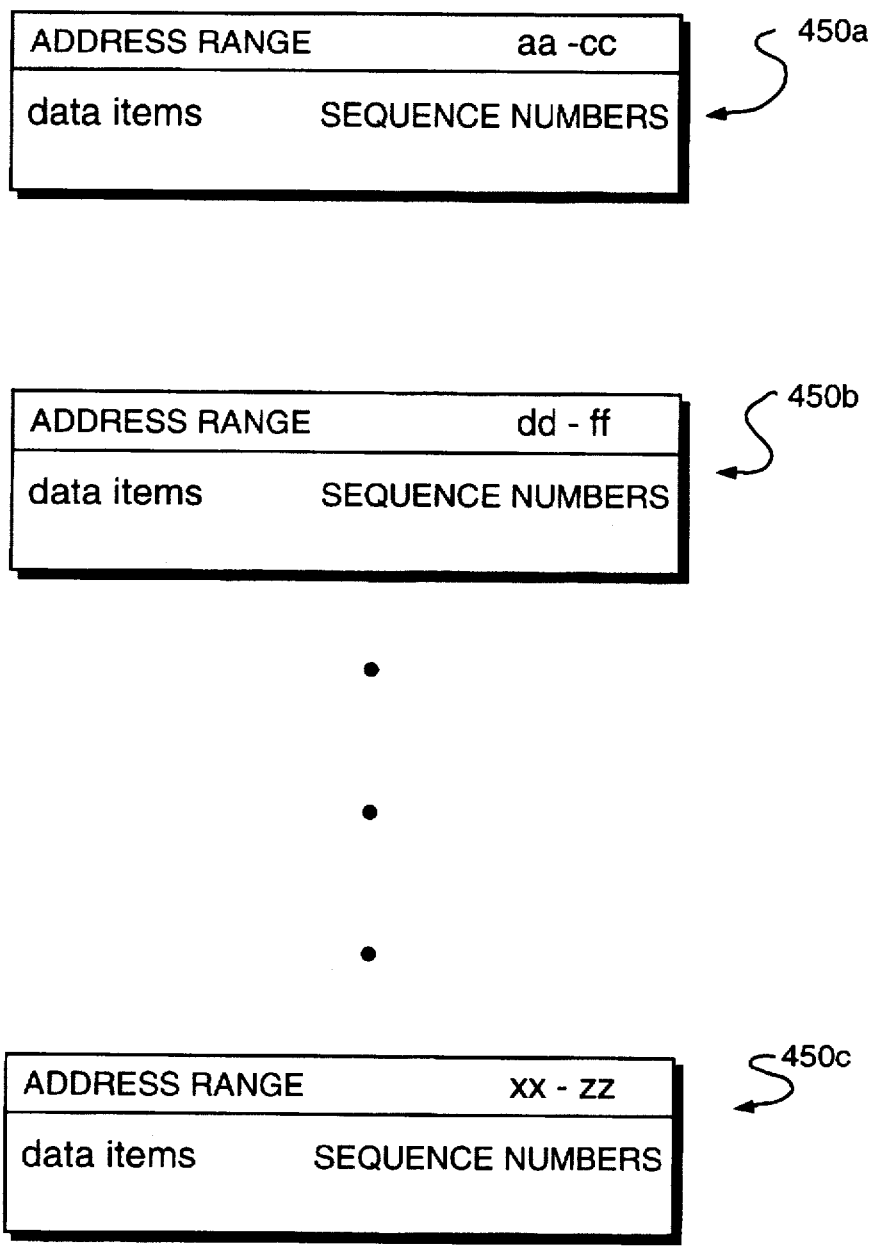

In order to characterize an entire LSP database, the CSNP may be very large, thereby requiring apportionment of the CSNP into smaller packet fragments for transmission over the network. FIG. 4B depicts schematic diagrams of CSNP fragments 450a–c, each of which comprises a list of sequence numbers tied to an address range of LSP data items. Each packet fragment 450a–c preferably characterizes a contiguous portion of the database, e.g., addresses xx-zz, and each is processed independently by the receiving routers. However, as routed, transmission of these additional smaller packet fragments 450a–c over the network consumes significant bandwidth, while processing of the additional individual packets consumes substantial amounts of computational resources in the routers.

In accordance with the invention, a mechanism is provided for efficiently synchronizing the contents of databases stored on nodes of a computer network to ensure that those contents are consistent. Specifically, the mechanism comprises a database identifier generated by a node of the computer network and distributed to other nodes coupled to the network. According to the invention, the database identifier is uniquely representative of the contents of the node's database and the other nodes compare this unique identifier with their own generated database identifiers to determine if the identifiers, and thus their databases, are consistent.

Figure 5:
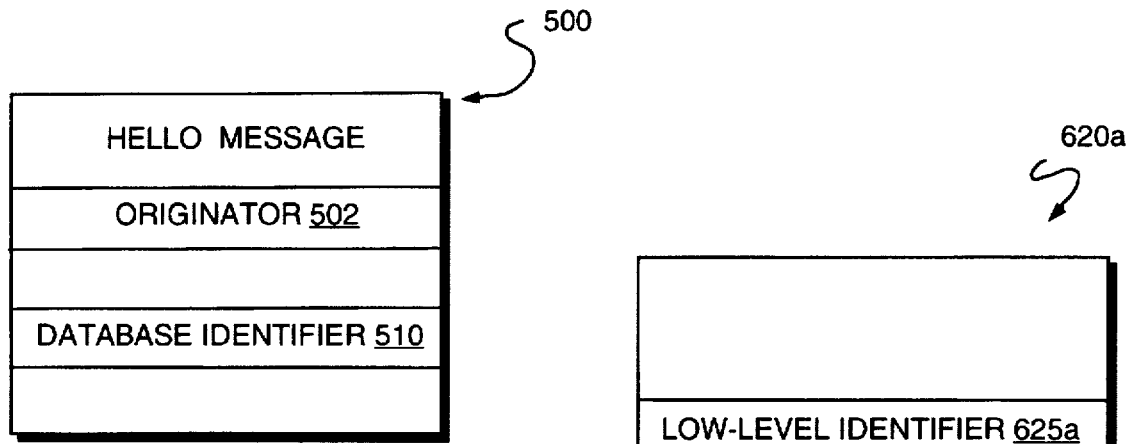
FIG. 5 is a schematic diagram illustrating an illustrative embodiment of a message containing a novel database identifier mechanism according to the present invention.

In the illustrative embodiment, the database identifier is uniquely representative of the CSNP. Referring also to FIG. 2, the node (e.g., a designated router which, for purposes of description, is router R4) generates the database identifier for the entire CSNP 400 and periodically broadcast that identifier, rather than the CSNP itself, to other nodes (e.g. routers) R1–R3 and R5–R6 coupled to LANs 1–2 by way of, e.g., a "hello" message. FIG. 5 is a schematic diagram of a hello message packet 500 containing, inter alia, information such as the novel database identifier 510 of the invention and the source identification (orginator) 502 of the message, i.e., the designated router R4.

Preferably, the database identifier 510 is generated from a cryptographic message digest algorithm executed by the CPU 202 and configured to transform the CSNP into a unique, fixed-length digest "signature" whose contents are substantially less than those of the CSNP. It should be noted, however, that the identifier 510 may be generated by other techniques, such as cyclic redundancy checking or sequence number generation by the CPU. The underlying requirement of such techniques is that they must be capable of producing unique values with high probability.

In the illustrative embodiment, the contents of the database identifier field may comprise a 64 or 128 bit length of the message, although any concise signature of relatively modest fixed length would suffice. A significant aspect of the invention is that the routers need only examine and compare the contents of these fixed length fields to ascertain the coherency of their databases. Accordingly, transmission of the database identifier in lieu of the CSNP optimizes both the use of computational resources within the other routers and bandwidth on the network.

Upon receiving the database identifer, the routers R1–R3 and R5–R6 process that identifier to determine whether any discrepancies arise and if so, those routers may request copies of the entire CSNP from the designated router R4. That is, each receiving router initially calculates an identifier based on the contents of its LSP database and then compares the calculated identifier with the database identifier received from the designated router. Of course, the routers R1–R3 and R5–R6 calculate their identifiers according to the same algorithm or technique used by router R4.

A receiving router whose calculated database identifier conforms to the received database identifier need only store that latter identifier of the CSNP. If the calculated identifier is different, the receiving router may request the entire CSNP from the designated router R4 to resolve any differences in its database. Significantly, R4 transmits the actual CSNP only in response to a change in its database or in response to a request from another router.

Figure 6A:
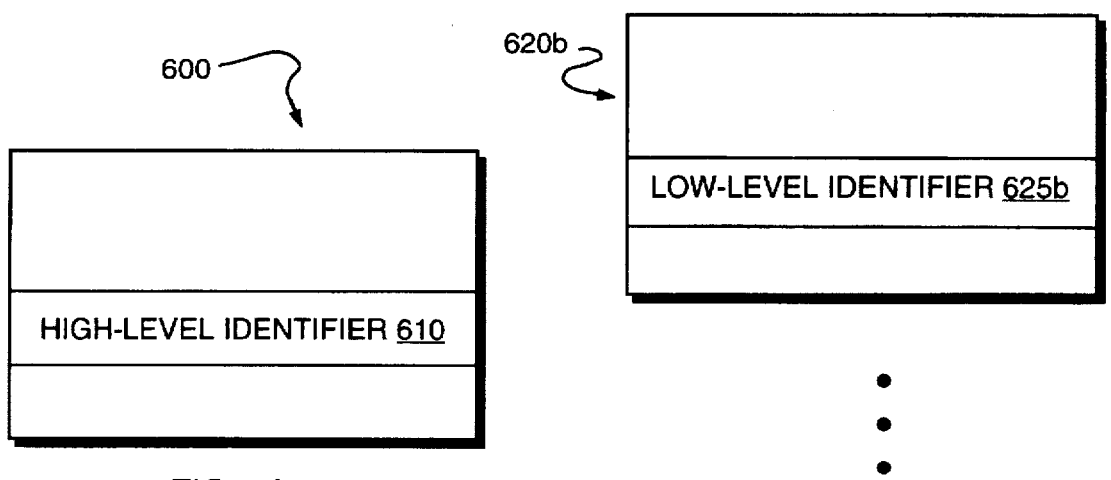
FIGS. 6A–6B are schematic diagrams of alternate embodiments of messages containing high-level and low-level database identifiers in accordance with the invention.
Figure 6B:
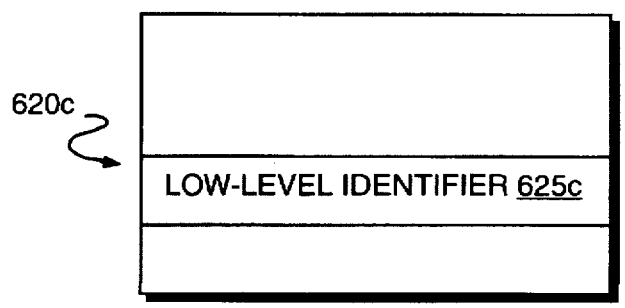

In the event a plurality of smaller packet fragments 450a–c are needed for transmitting the CSNP 400 over the LANs 1–2, the designated router preferably computes an identifier for each CSNP fragment. In an alternate embodiment of the invention, a hierarchical arrangement provides a single, high-level database identifier for the entire CSNP and a plurality of low-level database identifiers for these individual CSNP fragments. Referring to FIGS. 6A and 6B, the high-level identifier 610 is contained within a high-level hello message 600 that is periodically broadcast by the designated router R4. If a discrepancy between identifiers is discovered by a router, that router may request a particular low-level identifier 625a–c stored in low-level messages 620a–c, respectively; each identifier 625a–c corresponds to an appropriate CSNP fragment 450a–c.

Figure 7:
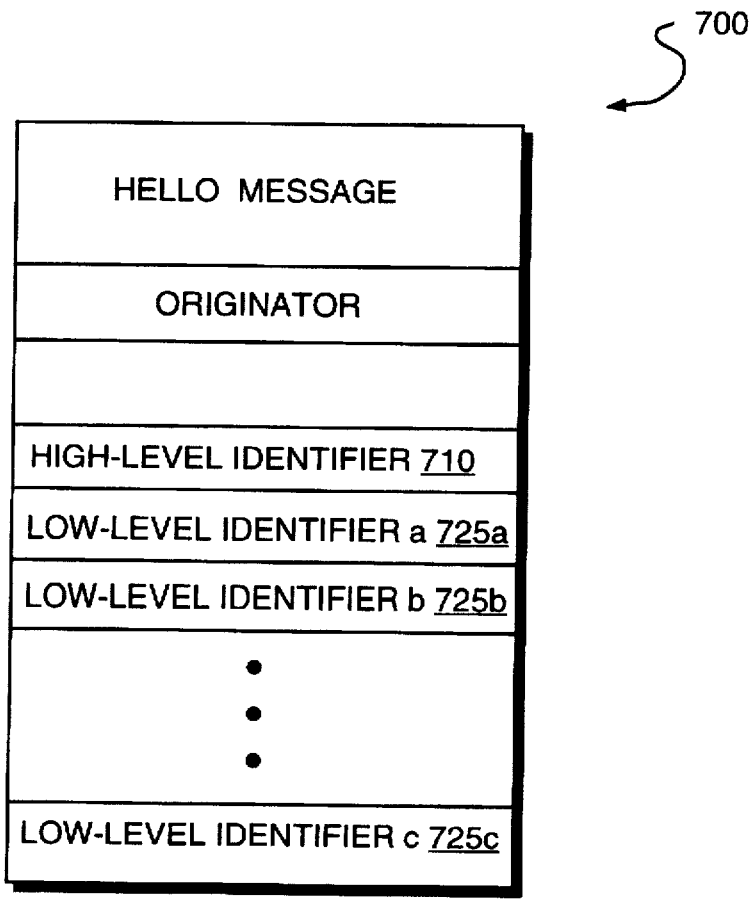
FIG. 7 is a schematic diagram of yet another alternate embodiment of a message containing various level database identifiers in accordance with the invention.

In a related alternate embodiment, the hierarchical arrangement is further modified to provide a two-stage operation arrangement at the receiving routers R1–R3 and R5–R6. Specifically, the high-level and low-level identifiers are bundled within the same hello message that is periodically broadcast by the designated router. R4 to the other routers. FIG. 7 is a schematic diagram of a hello message 700 containing the various level identifiers, such as high-level identifier 710 and low-level identifiers 725a–c.

According to the first operation stage of the arrangement, each receiving router calculates an identifier based on the entirety of its database, compares that identifier with the received high-level identifier 710 and, if they match, ignores the remainder of the message 700. On the Other hand, if the identifiers are dissimilar, the receiving router proceeds to the second stage, which specifies computations of identifiers for particular fragments of the database. These latter identifiers are thereafter compared with the appropriate low-level identifiers 725a–c to identify the inconsistent database. fragments.

One advantage of the invention is that extensive use of computational resources in the receiving routers is not required unless there are inconsistencies in the databases. In other words, the invention conserves processing resources by potentially eliminating the need to labor through identifier calculations and comparisons for each database fragment. In addition, the invention is flexible in that the number of hierarchical layers, database fragments and low-level identifiers are selectable.

While there has been shown and described illustrative embodiments for implementing a mechanism that efficiently synchronizes the LSP databases of routers coupled to a LAN, it is to be understood that various other adaptations and modifications may be made within the spirit and scope of the invention. For example, the mechanism described herein may be used in any type of distributed system requiring efficient synchronization of the contents of databases stored on nodes of a computer network. In the case of such distributed systems, a designated node of the computer network generates the database identifier and distributes that identifier to other nodes coupled to the network. According to the invention, the database identifier is uniquely representative of the contents of the designated node's database and the receiving nodes generate their own database identifiers from the contents of their databases so that they may compare their identifiers with that of the designated node to ensure that the contents of their databases are consistent.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A mechanism for efficiently synchronizing the contents of databases stored on nodes of a computer network, the mechanism comprising:

a database identifier generated by each node of the computer network from the contents of a database associated with each node;

node distribution means for distributing a database identifier to a receiving node of the network; and node comparison means for comparing a database identifier with the distributed database identifier to determine if the identifiers, and thus the databases, are synchronized.

2. The mechanism of claim 1 wherein the database identifier is uniquely representative of a complete sequence numbers packet pertaining to the contents of a link state packet database of the distributing node.

3. The mechanism of claim 2 wherein the nodes are routers and wherein the distributing node is a designated router.

4. The mechanism of claim 1 wherein the database identifier is generated by a technique for producing a fixed length value whose contents are unique with high probability and whose contents are further substantially less than those of the database.

5. The mechanism of claim 4 wherein the technique comprises a cryptographic message digest algorithm configured to transform the contents of the database into a unique, fixed-length digest.

6. The mechanism of claim 4 wherein the technique comprises cyclic redundancy checking.

7. The mechanism of claim 4 wherein the technique comprises sequence number generation.

8. An arrangement for efficiently synchronizing the contents of databases stored on routers of a computer network, the arrangement comprising:

a designated router coupled to the network and configured to generate a first database identifier from the contents of a first database associated with the designated router, the first database identifier uniquely representative of the contents of the first database; and at least one other router of the network configured to generate a second database identifier from the contents of a second database associated with the other router, the second database identifier uniquely representative of the contents of the second database, wherein the designated router periodically distributes the first database identifier to the other router which compares the first database identifier with the second database identifier to determine whether the database identifiers, and thus the first and second databases, are consistent.

9. The arrangement of claim 8 wherein the database identifiers are uniquely representative of complete sequence numbers packets (CSNP) pertaining to the contents of link state packet databases and wherein the designated router generates the first database identifier from the CSNP and periodically broadcasts the first database identifier, rather than the CSNP itself, to the other router.

10. A method for efficiently synchronizing the contents of databases stored on nodes of a computer network, the method comprising the steps of:

generating a first database identifer from the contents of a first database associated with a designated node coupled to the network, the first database identifier uniquely representative of the contents of the first database;

calculating second database identifiers from the contents of second databases associated with a plurality of other routers coupled to the network, the second database identifiers uniquely representative of the contents of the second databases;

periodically broadcasting the first database identifier to the other routers over the network; and processing the first database identifier at the other routers to determine whether there are any discrepancies between the first and second databases.

11. The method of claim 10 wherein the step of generating comprises the step of generating the first database identifier that is uniquely representative of a complete sequence numbers packet (CSNP) pertaining to the contents of a link state packet database associated with the designated router.

12. The method of claim 11 wherein the step of processing comprises the step of comparing the second database identifier with the first database identifier.

13. The method of claim 12 wherein the step of comparing comprises the step of, if the second database identifier matches the first database identifier, storing the first database identifier at the other routers.

14. The method of claim 12 wherein the step of comparing comprises the step of, if the second database identifier does not match the first database identifier, requesting the CSNP from the designated router.

15. The method of claim 11 further comprising the steps of:

generating third database identifiers, each of which is uniquely representative of a fragment of the CSNP pertaining to the contents of a LSP database associated with the designated router; and calculating fourth database identifiers, each of which is uniquely representative of a fragment of the CSNP pertaining to the contents of a LSP database associated with each other router.

16. The method of claim 15 wherein the step of processing comprises the step of comparing the second database identifier with the first database identifier.

17. The method of claim 16 wherein the step of comparing comprises the step of, if the second database identifier matches the first database identifier, storing the first database identifier at the other routers.

18. The method of claim 16 wherein the step of comparing comprises the step of, if the second database identifier does not match the first database identifier, comparing a particular third database identifier with a corresponding fourth database identifier to resolve any discrepancies.

* * * * *